Dec. 11, 1956  O. G. SCHWEDE  2,773,411
ANGULAR DISCRIMINATING OPTICAL DEVICE
Filed Dec. 30, 1955

INVENTOR.
OTTO G. SCHWEDE
BY
George J. Rubens
ATTORNEYS

United States Patent Office 2,773,411
Patented Dec. 11, 1956

2,773,411

ANGULAR DISCRIMINATING OPTICAL DEVICE

Otto G. Schwede, Ventura, Calif.

Application December 30, 1955, Serial No. 556,756

2 Claims. (Cl. 88—1)

(Granted under Title 35, U. S. Code (1952), sec. 266)

The invention described herein may be manufactured and used by or for the Government of the United States of America fo governmental purposes without the payment of any royalties thereon or therefor.

This invention relates to a novel angular discriminating optical device and is more particularly concerned with optical devices for reducing glare from lights or the sun.

This application is a continuation-in-part of co-pending U. S. application No. 292,775 of Otto G. Schwede, filed June 10, 1952, now Patent No. 2,731,872.

In night driving it has been established that it is generally the scattered light rays of an approaching bright headlight which blind a driver. These light rays, when entering the eye, affect the visibility in two ways. First, the weak impressions due to useful reflections from objects ahead of the driver are greatly reduced or eliminated by the powerful direct light transmission from the approaching headlights. Second, the mechanism of the human eye automatically adjusts the pupil of the eye to the total incoming quantity of light, and consequently, an aproaching powerful headlight causes automatic contraction of the pupil, which is normally wide open during the night, to a very small effective area, with an additional weakening of the useful light impressions as a result. The well known sensation which a blinded driver experiences is that of a black wall with two bright lights in it.

A similar but far weaker effect can be observed during the hours when the sun is near the horizon. The position of the sun, however, is not always directly ahead of the driver, so that he can often protect himself by means of a sun visor. But the principle of the sun visor cannot be applied to night driving because the source of light is almost directly ahead and at nearly the same level as the road, and hence us of a visor would thus eliminate from view a substantial portion of the road which must be observed. An opaque shade or light filter placed before the driver and capable of effective darkening of the disturbing headlights consequently would either darken the driver's own lane to a considerable degree or would not be effective at all.

Moreover, shielding a portion of the driver's field of vision with a screen or filter would have many disadvantageous features. First, a shade which affords a sharp separation between the left and right fields of vision would have to be placed at a great distance in front of the eyes due to the finite diameter of the pupil of the eye. In addition, two members, one extending from the nose, the other from the left temple to the screens would have to be provided. These members would narrow the useful field of vision and function like blinders. Second, the eyes of a driver would always be irritated by these supporting members brought directly into his field of vision. Increased inconvenience and insecurity would be the result.

Various devices have been proposed for reducing glare, particularly in night driving, including devices employing polarized light. However, the majority of such prior art devices have proven unsatisfactory in use.

The present invention employs first, second and third prism elements disposed in cooperative relationship to one another. The first and second prism elements have entrance faces and emergent faces disposed at an acute angle thereto, each of these emergent faces being disposed in spaced relationship and parallel to entrance faces of the third prism element. The emergent face of the first prism element is separated from one of the entrance faces of the third prism by a transparent lamina the index of refraction of which is less than that of the prism elements, and the emergent face of the second prism is separated from another entrance face of the third prism by an optical double layer comprising a light filter and a transparent lamina the index of refraction of which is less than that of the prism elements.

The angular discriminating device according to the invention as applied particularly to night driving provides a sharp separation between the light rays coming from one side of the road and the light rays coming from the other side thus eliminating the glare from the oncoming headlights and retaining full visibility of the driver's lane.

One object of the invention is to provide a new and novel angular discriminating optical device.

Another object is the provision of an optical device for reducing glare from lights or from the sun.

Yet another object of the invention is to afford simple and relatively inexpensive glare reducing or eliminating optical devices which may be worn by a car driver like spectacles, or which may be attached to the windshield of a vehicle, or which may be incorporated in any suitable manner in front of a driver of a vehicle and through which he may look while operating a car at night or against the sun.

Other objects and many of the attendant advantages of this invention will be readily appreciated as the same becomes better understood by reference to the following detailed description when considered in connection with the accompanying drawings wherein.

Figure 1:
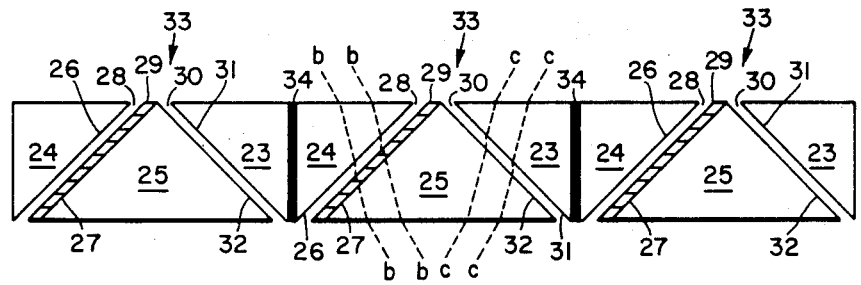
Fig. 1 is a schematic illustration of the invention device.

Referring now to Fig. 1 of the drawing, there is shown an optical device having three units indicated generally by reference numeral 33, each of the units comprising three transparent prism elements 23, 24 and 25. An optical double layer comprising a transparent lamina 28 the index of infraction of which is less than that of the prism elements and a light absorbing filter 29 is interposed between prisms 24 and 25 with lamina 28 in contact with face 26 of prism 24 and the filter 29 in contact with face 27 of prism 25. A transparent lamina 30 the index of refraction of which is less than that of the prism elements is disposed between and in contact with face 31 of prism 23 and face 32 of prism 25.

Each of the optical units 33 is operative in itself to provide angular discrimination to incoming light rays, but if it is desired to employ a plurality of units as illustrated in Fig. 1, it is necessary to provide a layer of opaque material 34 between adjacent faces of prisms 23 and 24. Layers 34 may consist of a thin piece of black paper for example, or any other similar substance which will prevent the passage of light rays therethrough.

It is apparent that each of the optical units 33 operates in a similar manner and hence the following description of the mode of operation will be described only in connection with the center unit shown in Fig. 1, but such description applies equally as well as to the other units thereof. Light rays coming from the right can pass through prism 25 only by passage first through the right prism 23 and rays coming from the left only by transmission initially through the left prism 24, even though the rays emanating from both directions strike each of prisms 23 and 24. Thus rays b—b emanating from a source to the left are transmitted through prism 24, thence through the optical double layer consisting of a lamina 28 and filter 29 and through prism 25, and finally emerge from prism 25 with their original angle of incidence. However, these rays are reduced in intensity by passage through filter 29. On the other hand, any rays b—b which strike and pass through prism 23 are totally reflected at face 31 because the angle of incidence of such rays is greater than the critical angle and hence they do not enter prism 25.

With respect to rays such as c—c coming from the right, these rays strike prism 23, are transmitted through it, transparent lamina 30 and prism 25, and emerge from prism 25 with their original angle of incidence and of substantially the same intensity as the original rays. Any rays c—c striking prism 24 pass through this prism and are totally reflected at surface 26 because their angle of incidence is greater than the critical angle; hence these rays do not enter prism 25. It is thus apparent in accordance with the embodiment of Fig. 1, that glare rays coming from the left are reduced in intensity, whereas rays coming from the right are transmitted practically undiminished in intensity.

Figure 2:
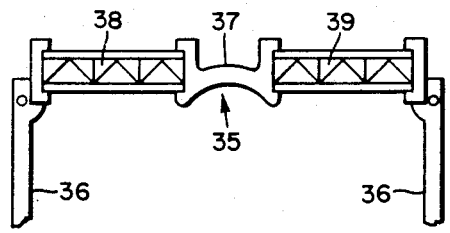
Fig. 2 is a horizontal cross-sectional schematic view of spectacles containing the optical device of Fig. 1.
Figure 3:
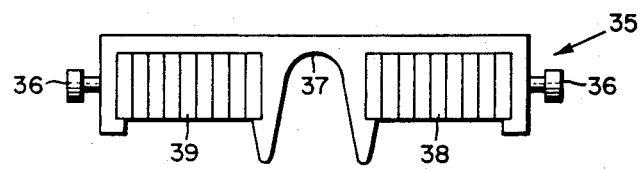
Fig. 3 is a front view of the spectacles shown in Fig. 2.

Figs. 2 and 3 disclose spectacles or eye glasses employing the optical device shown in Fig. 1. Such spectacles include a frame 35 having temple pieces 36 and a nose piece 37. Mounted in the spectacle frame are a pair of co-planar transparent plates 38 and 39, each of these plates being composed of a series of juxtaposed optical units as shown in Fig. 1. When the spectacles are worn by the driver of an automobile at night, glare rays emanating from approaching headlights at the left are attenuated while light rays directly in front and to the right of the driver are permitted to pass through eye pieces 38 and 39 practically undiminished in intensity. As seen particularly in Fig. 3, the lower rim of the spectacles frame is eliminated and the temple pieces 36 are mounted comparatively low so that when the spectacles are worn, the pupil of the eye is normally located just below the lenses or eye pieces 38 and 39. This enables a driver to wear the spectacles while still allowing him to observe the road directly without looking through the glasses. In the event of the presence of glare rays the wearer may adjust the spectacles merely by a slight tilting of the head to such a position that the glare disappears. In this manner maximum protection and safety with minimum irritation to the eyes is achieved.

Figure 4:
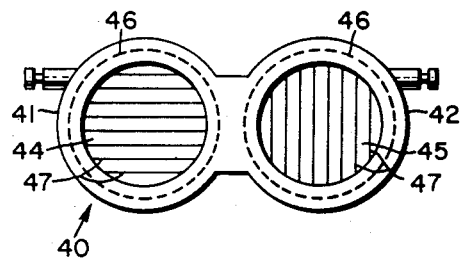
Fig. 4 is another type of spectacles embodying the optical device shown in Fig. 1.

Fig. 4 represents another type of spectacles also utilizing the optical units disclosed in Fig. 1. In this embodiment, the eye glass frame 40 is constructed with circular lens holder 41 and 42, each having an annular groove 46 therein. Optical lenses 44 and 45 composed of a series of juxtaposed optical elements as shown in Fig. 1 and circular in shape are mounted in the grooves 46 of the lens holders. The lenes or eye pieces 44 and 45 may be rotated in the grooves of the lens holders in any suitable manner so that the prism elements 47 of the eye pieces may be shifted to any angle from the horizontal as shown in the left eye piece of Fig. 4 to the vertical as shown in the right eye piece of Fig. 4. By means of this embodiment, the spectacles may be worn for night driving to eliminate glare from oncoming headlights by rotating both lenses to the position shown by the right eye piece of Fig. 4, or the spectacles may be used to eliminate glare from a low sun by rotating the lenses to the position shown by the left eye piece of Fig. 4.

As additional applications of the invention device, the latter may be attached to or incorporated as an integral part of the windshield of an automobile or vehicle to protect the driver thereof from glare rays, or the invention device may be positioned in front of the driver in any other suitable manner, e. g., by attachment to the conventional auto visor, for this purpose.

The transparent laminae employed in the invention device may include any media having a refractive index smaller than that of the prisms and larger than that of air. It is also to be understood that the prisms in the invention device may be constructed of materials other than glass. Further, the invention principles are not limited to a half and half division of the field of vision, but may also be utilized to divide the field of vision into more than two parts.

It is apparent from the foregoing that the invention provides a simple optical device for attenuating or substantially eliminating unwanted light rays of one direction while allowing the passage in practically undiminished intensity of desired light rays from a different direction, the device being particularly useful in the form of a glare protector for night operation of an automobile ot eliminate glare from headlights of cars approaching in the opposite lane while allowing practically undiminished and unobstructed vision of the highway in the driver's own lane and to his right. Moreover, the glare protection devices hereof may be readily adjusted in a manner to prevent blinding of the driver by a rising or setting sun close to the horizon.

A comparison of the glare protector according to the invention with devices utilizing polarized light further points out the advantages of the invention. In the first place, the operator of an automobile may protect himself from oncoming headlight glare by means of the invention device regardless of whether the approaching car is also equipped with the invention device. Further, the intensity of illumination and the visibility within the driver's own lane are not decreased as in the case of the use of devices employing polarized light, thus eliminating the necessity for the use of stronger light bulbs and power sources. Hence it is apparent that the invention device increases the safety of night driving by providing better vision for the driver and by reducing the strain on his eyes resulting from blinding headlights.

Obviously many modifications and variations of the present invention are possible in the light of the above teachings. It is therefore to be understood that within the scope of the appended claims the invention may be practiced otherwise than as specifically described.

I claim:

1. An optical unit which comprises first and second transparent prisms each having an entrance face in a common plane and a planar surface disposed at an acute angle to each of said entrance faces such that a portion of the light rays entering the entrance face is totally reflected and a portion of said rays is transmitted by said planar surface depending on their angle of incidence, each of said first and second prisms having a third surface connecting corresponding ends of said entrance faces and said planar surfaces thereof, a third transparent prism having two entrance faces each positioned parallel to a separate one of said planar surfaces and having an emergent face parallel to and spaced from the entrance faces of said first and second prisms, an optical double layer disposed between one of said planar surfaces and the adjacent entrance face of said third prism, said double layer comprising a light filter in contact with said last mentioned entrance face and a transparent lamina having an index of refraction less than that of said prisms adjacent to and in continuous contact with said filter and said last mentioned planar surface, and a second transparent lamina having an index of refraction less than that of said prisms interposed between and contacting said other planar surface and the adjacent face of said third prism, said third prism functioning to substantially restore the transmitted rays to their original direction.

2. An optical device comprising a plurality of juxtaposed optical units as defined in claim 1, the entrance faces of each of said first and second prisms being in a common plane and the emergent faces of each of said third prisms being in a common plane parallel to and spaced from said first plane, said third surface of one of said first prisms and said third surface of one of said second prisms being disposed adjacent one another and having an opaque member disposed therebetween preventing the passage of light rays through these surfaces.

No references cited.